United States Patent
Lee et al.

(10) Patent No.: US 9,456,052 B2
(45) Date of Patent: Sep. 27, 2016

(54) SOURCE NODE AND ROUTER IN CONTENT CENTRIC NETWORK, AND COMMUNICATION METHOD THEREOF

(75) Inventors: Ji Hoon Lee, Anyang-si (KR); Byoung Joon Lee, Seongnam-si (KR); Myeong Wuk Jang, Seoul (KR); Jae Hoon Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1061 days.

(21) Appl. No.: 13/454,383

(22) Filed: Apr. 24, 2012

(65) Prior Publication Data

US 2013/0029664 A1    Jan. 31, 2013

(30) Foreign Application Priority Data

Jul. 29, 2011  (KR) .......................... 10-2011-0075716

(51) Int. Cl.
*H04W 4/00* (2009.01)
*H04W 36/00* (2009.01)
*H04L 29/08* (2006.01)
*H04W 8/12* (2009.01)

(52) U.S. Cl.
CPC ............. *H04L 67/32* (2013.01); *H04L 67/327* (2013.01); *H04W 8/12* (2013.01); *H04W 36/0016* (2013.01)

(58) Field of Classification Search
CPC .............................. H04W 60/00; H04W 48/20
USPC ................................................. 455/435.1, 436
See application file for complete search history.

(56) References Cited

U.S. PATENT DOCUMENTS

| | | | |
|---|---|---|---|
| 6,654,359 B1 * | 11/2003 | La Porta et al. | 370/328 |
| 2009/0285209 A1 | 11/2009 | Stewart et al. | |
| 2009/0287835 A1 | 11/2009 | Jacobson | |
| 2009/0288163 A1 | 11/2009 | Jacobson et al. | |
| 2010/0195655 A1 | 8/2010 | Jacobson et al. | |
| 2011/0164516 A1 | 7/2011 | Kalkunte et al. | |
| 2013/0016695 A1 * | 1/2013 | Ravindran et al. | 370/331 |

FOREIGN PATENT DOCUMENTS

| | | |
|---|---|---|
| GB | 2409377 A | 6/2005 |
| WO | WO 2008/011384 A2 | 1/2008 |

OTHER PUBLICATIONS

Extended European Search Report mailed Jan. 7, 2015 in European Application No. 12177484.8 (6 pages, in English).

* cited by examiner

*Primary Examiner* — Omoniyi Obayanju
(74) *Attorney, Agent, or Firm* — NSIP Law

(57) ABSTRACT

Provided are a content source node and a first content router and a second content router in a content centric network (CCN), and a communication method thereof. The technology described herein may reduce the updating of routing information due to a movement of a mobile source node and the corresponding overhead, thereby reducing a rate of using an overall network resource by adding routing information, that is, partially updating the routing information of the corresponding mobile source node for content routers on a route through which the mobile source node moves.

21 Claims, 10 Drawing Sheets

SOURCE NODE AND ROUTER IN CONTENT CENTRIC NETWORK, AND COMMUNICATION METHOD THEREOF

CROSS-REFERENCE TO RELATED APPLICATION(S)

This application claims the benefit under 35 U.S.C. §119 (a) of Korean Patent Application No. 10-2011-0075716, filed on Jul. 29, 2011, in the Korean Intellectual Property Office, the entire disclosure of which is incorporated herein by reference for all purposes.

BACKGROUND

1. Field

The following description relates to a content source node and a content router in a content centric network (CCN), and a communication method thereof.

2. Description of Related Art

A content centric network (CCN) typically includes a transmission structure that is divided into an interest and data. A user may transmit a control packet in the CCN. The control packet may be an interest packet that has a content name desired by the user as a destination, that is, content that a user is interested in retrieving. A network device that has a CCN engine, may receive the interest packet and may search a routing table that has content names as identifiers, and may verify an existence of a routing list matching the content name included in the interest packet. A node that has the requested content stored therein may be referred to as a content source node.

In constructing a routing table for setting a route using a content name, several issues may occur when a content source node moves. For example, if a content source node moves in the CCN, prefix information based on a content name may be hindered from being aggregated. Thus, a number of routing tables or an amount of routing information may increase in a network. Further, updating of routing information may frequently occur, which may degrade an overall network performance.

SUMMARY

In one general aspect, there is provided a communication method of a mobile source node, the communication method including determining whether the mobile source node moves from a first domain including a first content router to a second domain including a second content router, wherein the first and second domains are in a content centric network (CCN) that performs routing and/or delivery based on a content name, and transmitting a prefix registration message indicating that the mobile source node moves, to the first content router, via the second content router, based on whether the mobile source node moves.

The determining may comprise determining whether the mobile source node moves to the second domain based on whether information about an underlying layer of the mobile source node is changed.

The prefix registration message may comprise at least one of prefix information including a name of the mobile source node and signature information that identifies that the prefix registration message is transmitted by the mobile source node.

In another aspect, there is provided a communication method of a first content router, the communication method including determining whether a prefix registration message is received, the prefix registration message indicating a mobile source node having content moves from a first domain including the first content router to a second domain including a second content router, wherein the first and second domains are in a content centric network (CCN) that performs routing and/or delivery based on a content name, and partially updating routing information of the mobile source node based on whether the prefix registration message is received.

The routing information of the mobile source node may not be updated in at least one intermediate router located at a position other than a route between the first domain and the second domain.

The partially updating may comprise determining whether a domain of the mobile source node matches a domain of the first content router based on the prefix registration message.

The determining may comprise determining whether a domain of the mobile source node matches a domain of the first content router based on prefix information included in the prefix registration message.

The communication method may further comprise determining whether the prefix registration message is received from the mobile source node based on signature information that is included in the prefix registration message.

The communication method may further comprise transmitting a response message reporting that the update is successful to at least one intermediate router located on a route between the first domain and the second domain, based on whether a domain of the mobile source node matches a domain of the first content router.

The at least one intermediate router may include the second content router, and the at least one intermediate router may partially update routing information of the mobile source node, in response to receiving the response message.

The at least one intermediate router may partially update routing information of the mobile source node by generating an individual forwarding information base (FIB) entry in relation to the mobile source node.

The first content router may include an FIB used for forwarding a control packet in the CCN, and the communication method may further comprise forwarding the prefix registration message to another content router in another hop using the FIB, in response to a domain of the mobile source node failing to match a domain of the first content router.

The communication method may further comprise receiving a new prefix registration message via a third content router, in response to the mobile source node moving from the second domain to a third domain including the third content router.

The communication method may further comprise transmitting, to the at least one intermediate router, a revocation message for revoking the individual FIB entry generated by the at least one intermediate router in relation to the mobile source node, in response to the mobile source node moving from the second domain to a third domain including a third content router.

The revocation message may comprise at least one of prefix information of the mobile source node and signature information that identifies that the revocation message is transmitted from the first content router.

In another aspect, there is provided a computer-readable storage medium having stored therein program instructions to cause a processor to execute a communication method of a mobile source node, the communication method including determining whether the mobile source node moves from a first domain including a first content router to a second domain including a second content router, wherein the first and second domains are in a content centric network (CCN) that performs routing and/or delivery based on a content name, and transmitting a prefix registration message indicating that the mobile source node moves, to the first content router, via the second content router, based on whether the mobile source node moves.

In another aspect, there is provided a mobile source node, including a determining unit configured to determine whether the mobile source node moves from a first domain including a first content router to a second domain including a second content router, wherein the first and second domains are in a content centric network (CCN) that performs routing and/or delivery based on a content name, and a transmitter configured to transmit a prefix registration message indicating the mobile source node moves, to the first content router, via the second content router, based on whether the mobile source node moves.

The prefix registration message may comprise at least one of prefix information including a name of the mobile source node and signature information that identifies that the prefix registration message is transmitted by the mobile source node.

In another aspect, there is provided a content router, including a determining unit to determine whether a prefix registration message is received, the prefix registration message indicating a mobile source node moves from a first domain including the content router to a second domain including a second content router, wherein the first and second domains are in a content centric network (CCN) that performs routing and/or delivery based on a content name, and an updating unit configured to partially update routing information of the mobile source node based on whether the prefix registration message is received.

The routing information of the mobile source node may not be updated in at least one intermediate router located at a position other than a route between the first domain and the second domain.

In another aspect, there is provided a content router in a content centric network (CCN) including a plurality of domains that performs routing and/or delivery based on content name, the content router including a receiver configured to receive a prefix registration message from a mobile source node indicating that the mobile source node has moved from a previous domain in the CCN including a previous content router to a current domain in the CCN including the content router, and a transmitter configured to transmit the prefix registration message to the pervious content router.

The receiver may be further configured to receive a registration response message from the previous content router indicating a successful partial update of the source node's routing information, and the transmitter may be further configured to transmit the registration response to the source node.

The content router may further comprise an update unit configured to partially update routing information of the source node, in response to receiving the response message from the previous content router.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

Figure 1:
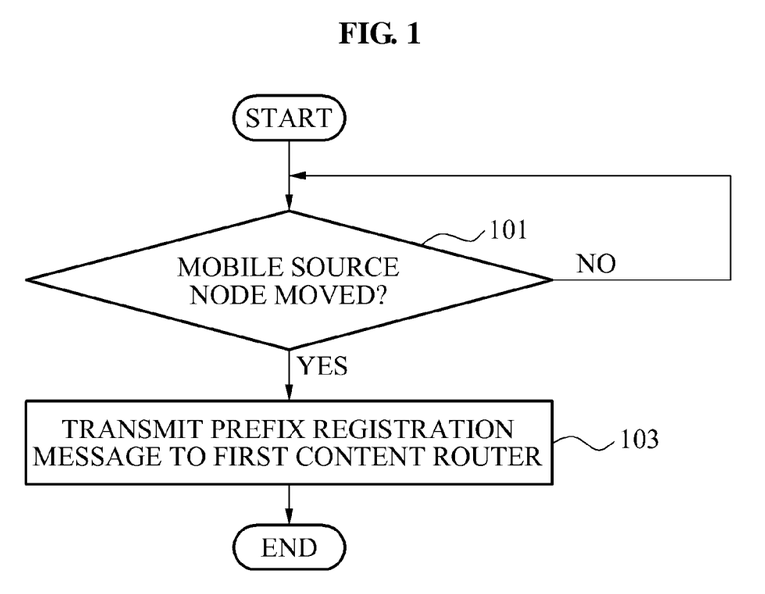
FIG. 1 is a flowchart illustrating an example of a communication method of a mobile source node in a content centric network (CCN).

FIG. 1 illustrates an example of a communication method of a mobile source node in a content centric network (CCN). Hereinafter, it is assumed that various devices, for example, a mobile source node, a content router, and the like, in the CCN have an inherent name prefix. In various examples, a mobile source node is a node that has content requested by a content request node. For example, a node may be a terminal such as a mobile phone, a server, a router, a computer, a tablet, an appliance, and the like Referring to FIG. 1, in 101, the mobile source node determines whether the mobile source node moves from a first domain in a CCN including a first content router to a second domain in the CCN including a second content router. In this example, a movement from the first domain to the second domain may include a physical movement from a spot "a" to a spot "b" and a movement from a first virtual group (or first domain) to a second virtual group (or second domain) in a virtual space or in an Internet domain.

The CCN may perform routing or delivery based on a content name. Thus, it may be difficult to determine whether a node moves using an actual address such as an Internet protocol (IP) address, and the like in the CCN. Therefore, as described herein the mobile source node may determine whether the mobile source node moves from the first domain to the second domain based on whether information about an underlying layer of the CCN has changed.

For example, underlying information may include a change of an IP address in a wireless local area network (WLAN) or other network, a change of a wireless fidelity (Wi-Fi) address, that is, a change of a point of attachment (POA), a magnitude of a signal of a physical link, a router advertisement of a layer three, and the like.

In response to determining that the mobile source node moves in 101, the mobile source node transmits a prefix registration message indicating that the mobile source node moves, to the first content router, via the second content router, in 103.

For example, the prefix registration message may include at least one of prefix information and signature information. The prefix information may include a name of the mobile source node. The name of the mobile source node may include a content name. The signature information may identify that the prefix registration message is transmitted by the mobile source node. For example, the prefix registration message may include prefix information about the domain that the mobile source node is currently located at.

A content router receiving the prefix registration message may determine whether to update routing information of the mobile source node based on information included in the received prefix registration message.

In response to determining that the mobile source node does not move from the first domain to the second domain in 101, the mobile source node may monitor whether the mobile source node moves based on whether the information about an underlying layer is changed. For example, the mobile source node may continuously or periodically monitor.

Figure 2:
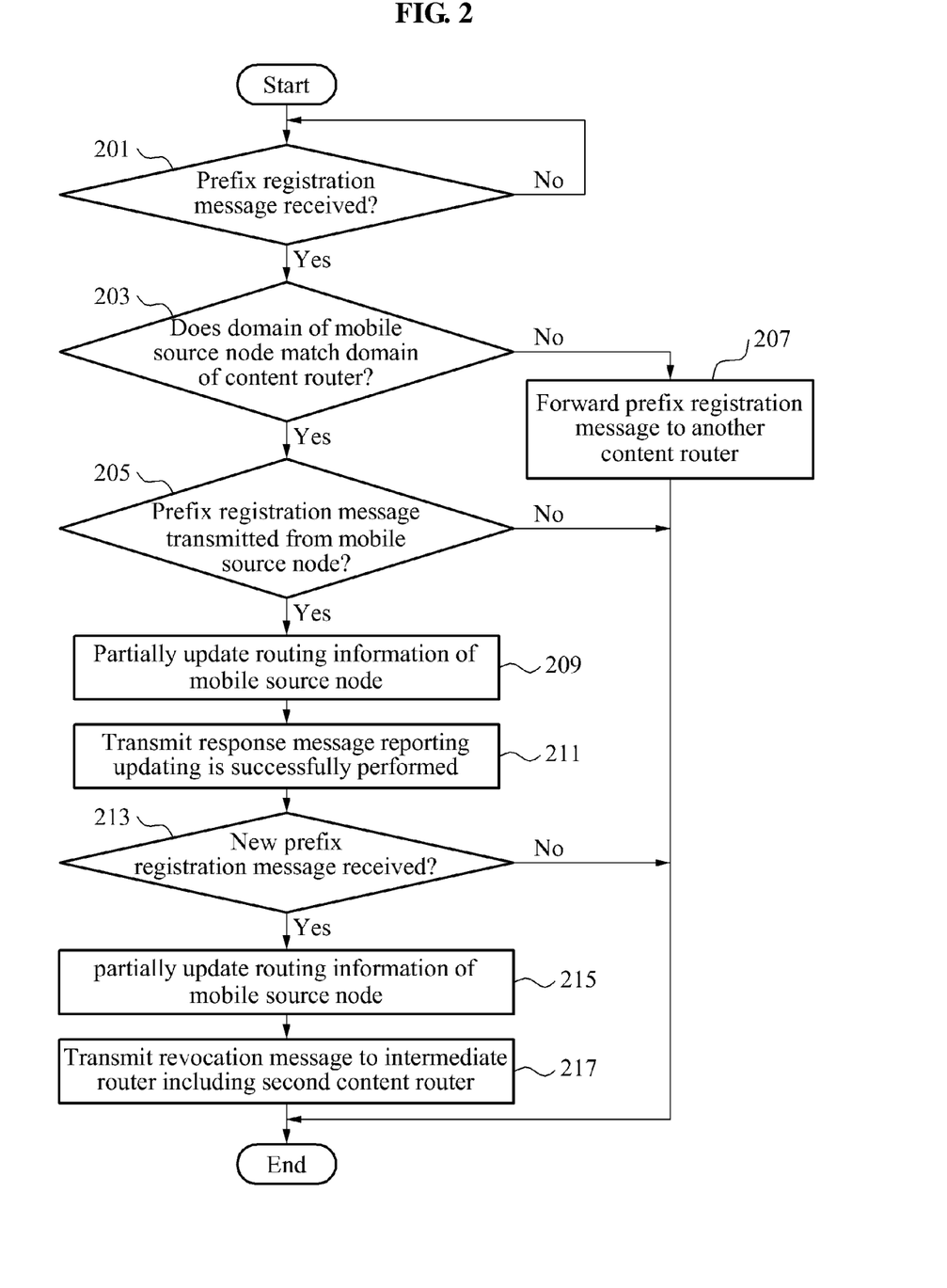
FIG. 2 is a flowchart illustrating an example of a communication method of a first content router in a CCN.

FIG. 2 illustrates an example of a communication method of a first content router in a CCN. In this example, the first content router refers to a content router included in an original domain in which a mobile source node is originally located. A second router refers to a content router included in a second domain to which the mobile source node moves to.

Referring to FIG. 2, in 201, the first content router determines whether a prefix registration message indicating that a mobile source node moves from the first domain including the first content router to the second domain including the second content router, is received.

In 203, the first content router determines whether a domain of the mobile source node matches a domain of the first content router based on the prefix registration message. For example, the first content router may determine whether the domain of the mobile source node matches the domain of the first content router based on prefix information that is included in the prefix registration message.

In response to the domain of the mobile source node matching the domain of the first content router in 203, the first content router determines whether the prefix registration message is received from the mobile source node, in 205. For example, signature information included in the prefix registration message may identify that the prefix registration message was transmitted by the mobile source node. In this example, if the prefix registration message is confirmed, through the signature information, to be transmitted from a node registered in a routing table of the first content router, the first content router may transmit a response message as will be described in 211.

In response to the domain of the mobile source node not matching the domain of the first content router in 203, the first content router may forward the prefix registration message to another content router in a subsequent hop, using an existing forwarding information base (FIB), and then terminate an operation. In this example, the FIB may correspond to information used for forwarding a control packet in the CCN, and each of content routers in the CCN may include, for example, the FIB, a content cache, and a pending interest table (PIT).

In 209, the first content router partially updates routing information of the mobile source node based on whether the prefix registration message is received. For example, the first content router may partially update routing information for transmitting, to a new position of the mobile source node, an interest packet delivered from a predetermined content requester.

An example of partially updating routing information of the mobile source node is described below.

Due to movements between nodes included in the CCN, and the like, a time period for accessing and identifying content included in the mobile source node may increase. Thus, information about a name prefix in the FIB may be promptly updated in an overall network.

However, if a name prefix entry is managed for each mobile source node in the FIB for each content source node, the number of FIB entries may increase due to a movement of the content source node. The increase in routing entries may cause an increase in a time period for delivering a packet and complexity in managing routing information.

Thus, according to various examples herein, by additionally constructing partial routing information for the corresponding mobile source node rather than updating a routing list in an overall network, an amount of routing information to be updated may be reduced while maintaining reachability for the mobile source node.

According to various examples herein, content routers that are on a route between an original domain of the mobile source node and a domain in which the mobile source node is currently located may add (or extend) routing information of the corresponding mobile source node. One or more of the content routers on a passing route, rather than all content routers included in the CCN, may extend a route by generating an individual FIB entry for the mobile source node, which may be expressed by a "partial update."

In 211, the first content router transmits a response message indicating that the update is successful to at least one intermediate router, based on whether a domain of the mobile source node matches a domain of the first content router. For example, the at least one intermediate router may be a content router that is located on a route between the first domain and the second domain, and may include the second content router.

In this example, the at least one intermediate router receiving the response message may partially update the routing information of the mobile source node, in response to receiving the response message. For example, the at least one intermediate router may partially update the routing information of the mobile source node by generating an individual FIB entry for the mobile source node. An example of the individual FIB entry is a flag entry, and the like, indicating validity of routing information.

Thereafter, the mobile source node may transmit a new prefix registration message to a first content router, via a third content router, in response to the mobile source node moving from the second domain to a third domain including the third content router.

In 213, the first content router determines whether the new prefix registration message is received.

If it is determined that the new prefix registration message is received in 213, the first content router partially updates new routing information of the mobile source node based on the new prefix registration message, in 215.

Thereafter, in 217, the first content router transmits a revocation message to the at least one intermediate router. In this example, the revocation message may be used to revoke the individual FIB entry generated by the at least one intermediate router in relation to the mobile source node. Here, "revoke" may refer to "delete."

The revocation message may include at least one of prefix information of the mobile source node and signature information that identifies that the revocation message is transmitted from the first content router. The revocation message may be for revoking the individual FIB entry generated by the second content router for the mobile source node, in response to the mobile source node moving from the second domain moves to the third domain.

According to various aspects herein, if an extended route is not used for the mobile source node, routing information for the extended route may be deleted, thereby preventing routing information in a network from increasing and an overall network performance from decreasing.

Referring again to FIG. 2, if it is determined that the new prefix registration message is not received in 213, the first content router may terminate an operation. Further, when it is determined that the new prefix registration message is not received in 213, the first content router may monitor whether the new prefix registration message is received. For example, the first content router may periodically or continuously monitor whether the new prefix registration message is received.

In this example, the routing information of the mobile source node may not be updated in at least one intermediate router located at a position other than a route between the first domain and the second domain. Accordingly, it is possible to reduce frequent updating of routing information due to a movement of a mobile source node and the corresponding control packet overhead in a network, thereby reducing a rate of using an overall network resource.

Figure 3:
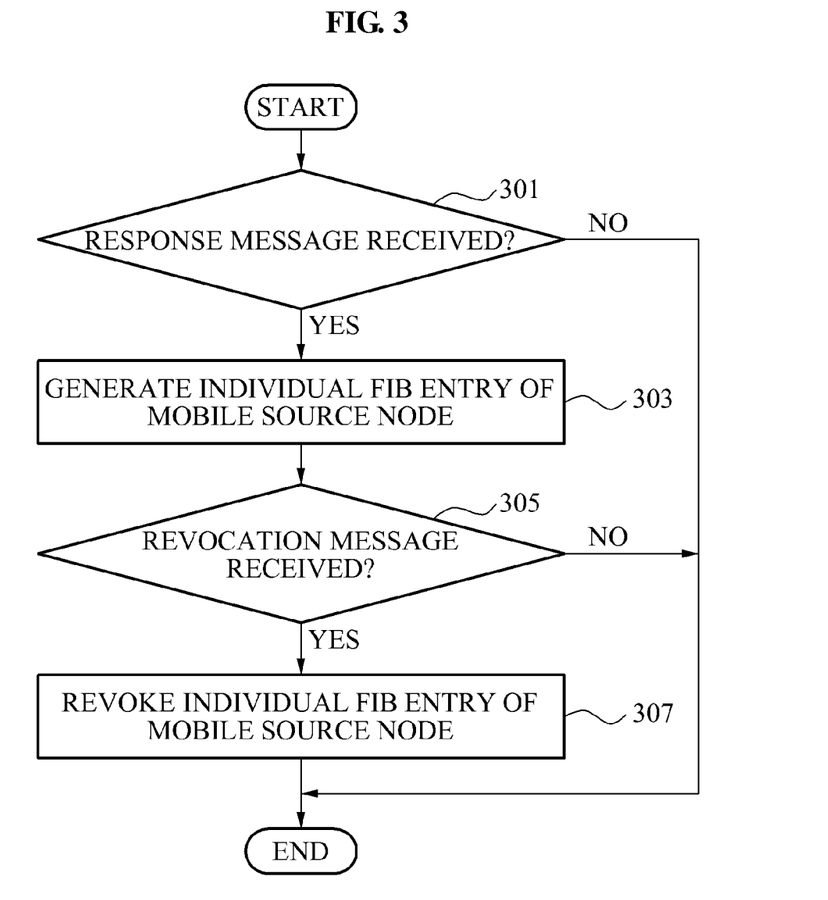
FIG. 3 is a flowchart illustrating an example a communication method of at least one intermediate router in a CCN.

FIG. 3 illustrates an example of a communication method of at least one intermediate router in a CCN.

If a mobile source node moves from a first domain in which the mobile source node is originally located to a second domain, a second content router included in the second domain may correspond to an intermediate router. When no content router other than the second content router is included between the first domain and the second domain, an intermediate router may be the second content router.

Referring to FIG. 3, if the mobile source node moves from the first domain to the second domain in the CCN, the at least one intermediate router determines whether a response message is received from a first content router in 301. In this example, the response message may correspond to a data packet.

If the response message is determined to be received in 301, the at least one intermediate router may partially update routing information of the mobile source node in response to receiving the response message. In the example of FIG. 3, in 303, the at least one intermediate router generates an individual FIB entry for the mobile source node. If the response message is determined not to be received in 301, the at least one intermediate router may monitor whether the corresponding response message is received, or may terminate an operation.

If the mobile source node moves from the second domain to a third domain including a third content router, the first content router may transmit a revocation message to the at least one intermediate router. In this example, in 305, the at least one intermediate router determines whether the revocation message is received from the first content router.

For example, the revocation message may be a message for revoking the individual FIB entry generated by the at least one intermediate router in relation to the mobile source node. The revocation message may correspond to an interest packet. The revocation message may include at least one of prefix information of the mobile source node and signature information that identifies whether the revocation message is transmitted from the first content router.

The at least one intermediate router may verify an object, that is, a node of the routing information that is to be revoked, based on the prefix information of the mobile source node. The at least one intermediate router may verify, through the signature information, that the revocation message is received from a suitable content router having a management right for the mobile source node.

In response to the revocation message not being received in 305, the at least one intermediate router may monitor whether the corresponding revocation message is received, or may terminate an operation.

In response to the revocation message being received in 305, in 307 the at least one intermediate router may revoke, that is, delete the individual FIB entry for the mobile source node generated in 303.

Figure 4:
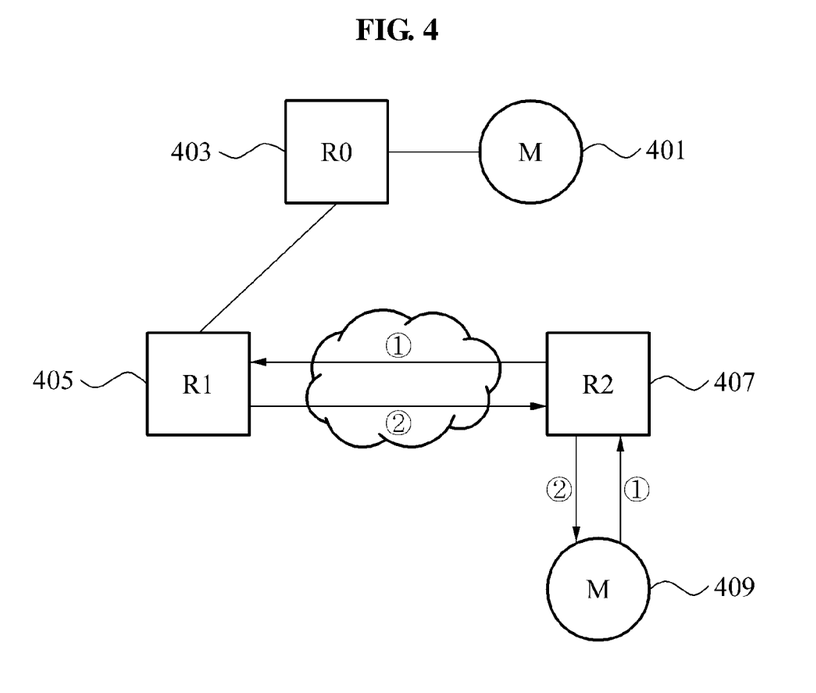
FIG. 4 is a diagram illustrating an example of a scheme for transmitting a prefix registration message.

FIG. 4 illustrates an example of a scheme of transmitting a prefix registration message.

Referring to FIG. 4, M 401 denotes a content requester, and R0 403 denotes a content router managing the content requester. R1 405 denotes a content router, that is, a first content router included in a first domain in which a mobile source node is located. R2 407 denotes a second router included in a second domain, to which the mobile source node moves from the first domain. M 409 denotes a mobile source node having content requested by the content requester.

In this example, M 409 moves from the first domain including R1 405 to the second domain including R2 407, and routing update information of M 409 is not delivered to an entire network. In this example, M 409 may not receive an interest packet transmitted by M 401, and thus, a service disruption latency may increase. Interest packets retransmitted due to a delay in a PIT may increase, which may cause an issue of degrading a performance of the entire network.

Thus, according to various aspects, by suppressing an increasing amount of routing information and reducing a time period for updating routing information in a CCN, an effective route may be formed in an environment having a mobile source node that moves frequently.

In this example, M 409 moving from the first domain to the second domain may determine whether M 409 moves based on whether information about an underlying layer is changed. In this example, M 409 recognizing M 409 moved from the first domain to the second domain may remotely transmit a prefix registration message to R1 405, indicated by an arrow ①. In this instance, the prefix registration message may be transmitted to R1 405 via R2 407. The prefix registration message may correspond to an interest packet.

R1 405 receiving the prefix registration message may partially update routing information of M 409 based on prefix information included in the prefix registration message. Thereafter, R1 405 transmits, to M 409, a response message reporting an update according to the prefix registration message is successful, indicated by an arrow ②. For example, the response message may correspond to a data packet, and may be transmitted to M 409 via R2 407.

R2 407 receiving the response message may partially update the routing information of M 409, in response to receiving the response message. If the routing information of M 409 is updated, R1 405 may transmit, to M 409, an interest packet related to content requested by M 401. An example of this is described with reference to FIG. 5.

Figure 5:
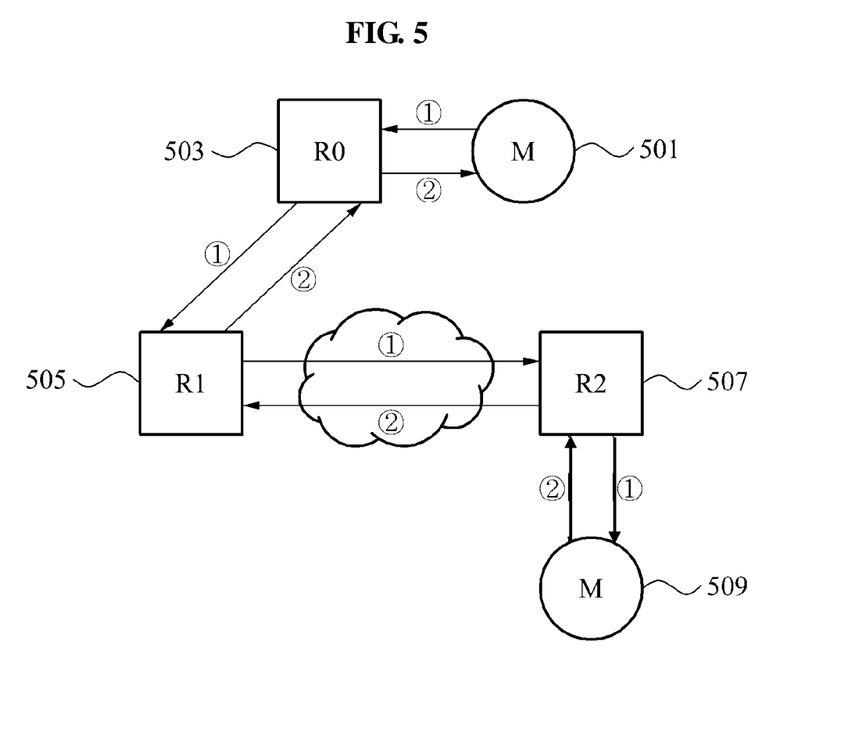
FIG. 5 is a diagram illustrating an example of a scheme for transmitting an interest packet from a content requester to a mobile node having content.

FIG. 5 illustrates an example of a scheme of transmitting an interest packet from a content requester to a mobile node having content.

Referring to FIG. 5, M 501 denotes a content requester, and R0 503 denotes a content router managing the content requester, that is, M 501. R1 505 denotes a first content router included in a first domain in which a mobile source node is located. R2 507 denotes a second content router included in a second domain to which the mobile source node moves from the first domain. M 509 denotes a mobile source node having content requested by the content requester.

If M 501 requests content, for example, "/M/aaa.mov/ v_3/s16" included in or stored in M 509, M 501 may transmit, to a CCN via R0 503, an interest packet requesting the corresponding content, indicated by an arrow ①. The interest packet may include a name, for example, "/M/ aaa.mov/v_3/s16" of content requested by M 501.

R1 505 receiving the interest packet may deliver the corresponding interest packet to M 509 via R2 507, indicated by an arrow ①. Here, the arrow ① indicates a movement of the interest packet. In this example, because R1 505 verifies that a new location of the mobile source node corresponds to the second domain using the prefix registration message of FIG. 4, R1 505 may forward the interest packet to R2 507 included in the corresponding domain.

M 509 receiving the interest packet may search a memory of M 509, and then may transmit the corresponding content using an interface via which the interest packet is received, in response to the corresponding content being included in the memory, indicated by an arrow ①.

R2 507 receiving content from M 509 may transmit the corresponding content to R0 503 using a route through which the interest packet is transmitted, indicated by an arrow ②. R0 503 may deliver the corresponding content to M 501, indicated by an arrow ②. For example, content delivered to M 501 may correspond to a data packet, and may include "/M/aaa.mov/v_3/s16" as the interest packet does. Here, ② indicates a movement of the data packet.

As described herein, in response to M 509 receiving the interest packet having the corresponding content (or file), M 509 may deliver the data packet using a reverse route through which the interest packet is received. The content (or a file) may be stored by being segmented so as to be suitable for a transmission unit, and each interest packet may be transmitted in a type of a predetermined segment of desired content with an enclosed segment number.

If the corresponding content is not included in the local cache of M 509 receiving the interest packet, M 509 may store, in a pending interest table (PIT), information about an interface via which the interest packet is received to subsequently transmit a data packet and information for indicating the corresponding interest packet is exchanged. Thereafter, an outgoing interface may be determined using information in a forwarding information base (FIB) while transmitting the interest packet. This operation may be performed repeatedly until the interest packet is delivered to a node having the corresponding content.

Figure 6:
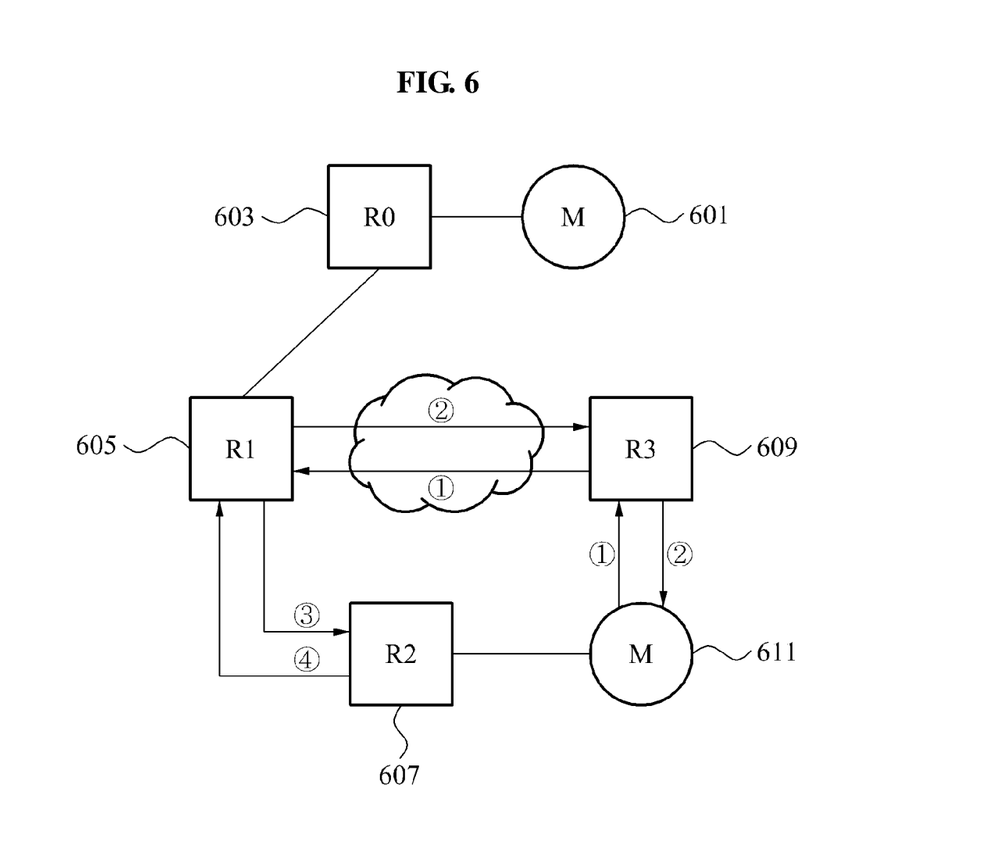
FIG. 6 is a diagram illustrating an example of a communication method in which a mobile source node moving to a second domain moves to a third domain in a CCN.

FIG. 6 illustrates an example of a communication method in which a mobile source node moving to a second domain moves to a third domain in a CCN.

Referring to FIG. 6, M 601 denotes a content requester, and R0 603 denotes a content router managing the content requester, that is, M 601. R1 605 denotes a first content router included in a first domain in which a mobile source node is located. R2 607 denotes a second content router included in a second domain to which the mobile source node moves from the first domain. R3 609 denotes a third content router included in a third domain to which the mobile source node moves from the second domain. M 611 denotes a mobile source node having content requested by the content requester.

If M 611 moves from the second domain to the third domain, M 611 may remotely transmit a prefix registration message to the R1 605, indicated by an arrow ①. In this example, the prefix registration message may be transmitted to R1 605 via R3 609.

R1 605 receiving the prefix registration message may partially update routing information of M 611 based on prefix information included in the prefix registration message. Thereafter, R1 605 may transmit a response message to M 611, reporting an update according to the prefix registration message being successful, which is indicated by an arrow ②. In this example, the response message may be transmitted to M 611 via R3 609.

As described herein, upon completion of updating routing information of the third domain to which M 611 moves, R1 605 may transmit a revocation message to R2 607 corresponding to a router included in the second domain in which the M 611 is located, indicated by an arrow ③.

The revocation message, corresponding to an interest packet, refers to a message requesting a revocation, that is, a deletion of an individual FIB entry generated by M 611, in relation with M 611.

R2 607 may transmit, to R1 605, a response message reporting that the revocation message is successfully transmitted, indicated by an arrow ④. The response message may correspond to a data packet.

Figure 7:
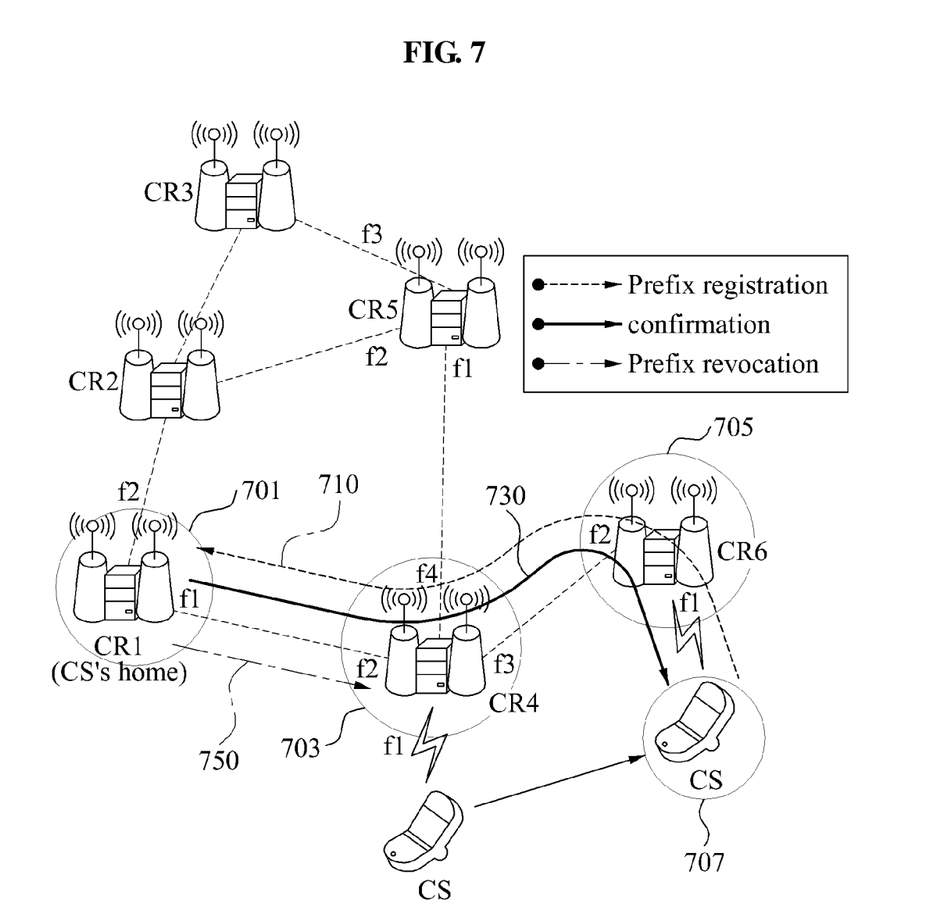
FIG. 7 is a diagram illustrating an example of a change of routing information that occurs when a mobile source node moving to a second domain moves to a third domain in a CCN.

FIG. 7 illustrates an example of a change of routing information that occurs when a mobile source node moving to a second domain moves to a third domain in a CCN.

Referring to FIG. 7, CR1 701 denotes a content router included in a first domain, CR4 703 denotes a content router included in a second domain, and CR6 705 denotes a content router included in a third domain of the mobile source node. In this example, the mobile source node is capable of moving between the first domain, the second domain, and the third domain.

CS 707 denotes a mobile source node having content. In this example, CR2, CR3, and CR5 denote intermediate routers located at a position other than a position on a route between domains, that is, the first, second, and third domains to which the CS 707 moves. In this example, f1, f2, f3, and f4 denote faces, that is, interfaces through which an interest packet is received.

In response to CS 707 moving from the second domain to the third domain, CS 707 may deliver, to CR1 701, a prefix registration message reporting that CS 707 moves to the third domain using a route 710 that passes through CR6 705 and CR4 703.

In response to the prefix registration message, CR1 701 may deliver a response message to CS 707 using a route 730 that passes through CR4 703 and CR6 705 starting from CR1 701. In this example, CR4 703 and CR6 705 located on the route 730 may receive the corresponding response message.

CR4 703 receiving the response message may construct an FIB as Table 1 shown below.

TABLE 1

| Prefix | Outgoing Face | Lifetime | Flag |
|---|---|---|---|
| CS | f1 | | valid |
| CS | f3 | | tentative |

In Table 1, a name of content included in CS 707 corresponds to CS, and prefix information of the FIB may correspond to CS.

Information about a face through which the prefix registration message is received may be recorded in an outgoing face so as to subsequently deliver received packets to a current position of the mobile source node. The corresponding outgoing face may be used when the response message is received.

In this example, a flag may correspond to an example of an individual FIB entry generated for CS 707 by CR4 703. Thus, CR2, CR3, and CR5 corresponding to intermediate routers located on a position other than a position among the first, second, and third domains to which the CS 707 moves, may not include the flag in the FIB.

After transmitting the response message, CR1 701 may transmit a revocation message to CR4 703 using a route 750. In this example, the CR4 703 receiving the revocation message may change the FIB as shown in Table 2.

TABLE 2

| Prefix | Outgoing Face | Lifetime | Flag |
|---|---|---|---|
| CS | f1 | | stale |
| CS | f3 | | valid |

Figure 8:
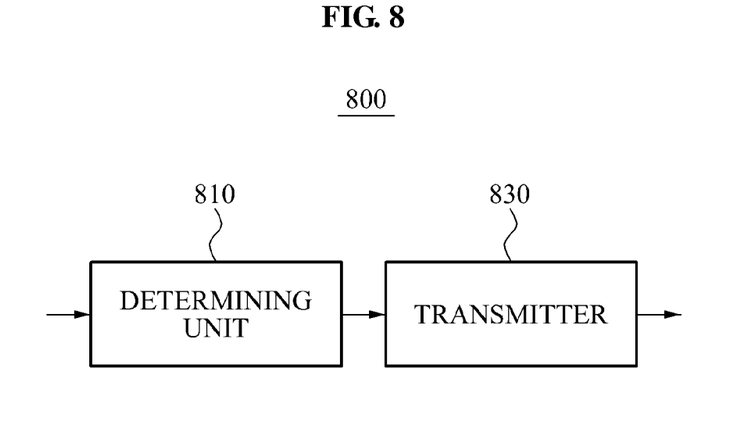
FIG. 8 is a diagram illustrating an example of a mobile source node in a CCN.

FIG. 8 illustrates an example of a mobile source node in a CCN. The CCN may perform routing and/or delivery based on a content name.

Referring to FIG. 8, mobile source node 800 includes a determining unit 810 and a transmitter 830.

The determining unit 810 may determine whether the mobile source node having content moves from a first domain including a first content router to a second domain including a second content router.

The transmitter 830 may transmit a prefix registration message indicating the mobile source node moves to the first content router via the second content router based on whether the mobile source node moves.

For example, the prefix registration message may include prefix information and/or signature information. The prefix information may include a name of content included in the mobile source node. The signature information may be used to identify that the prefix registration message is transmitted by the mobile source node.

Figure 9:
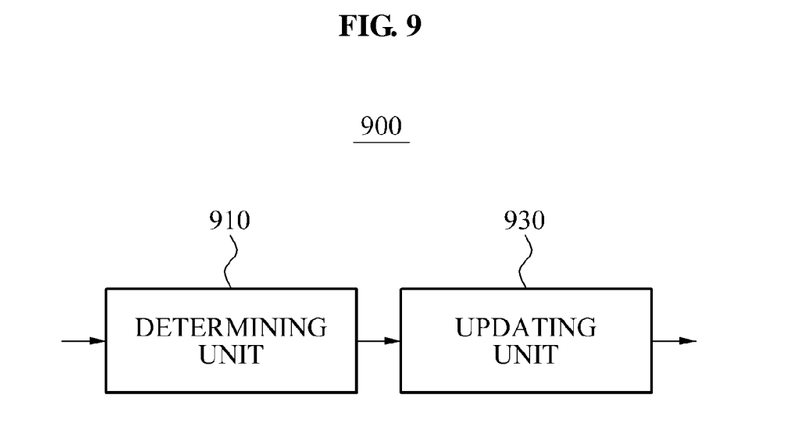
FIG. 9 is a diagram illustrating an example of a first content router in a CCN.

FIG. 9 illustrates an example of a first content router in a CCN.

Referring to FIG. 9, first content router 900 includes a determining unit 910 and an updating unit 930.

The determining unit 910 may determine whether a prefix registration message is received. The prefix registration message may indicate a mobile source node having content moves from a first domain including the first content router to a second domain including a second content router.

The updating unit 930 may partially update routing information of the mobile source node based on whether the prefix registration message is received.

For example, the routing information of the mobile source node may not be updated in at least one intermediate router located at a position other than a route between the first domain and the second domain.

Figure 10:
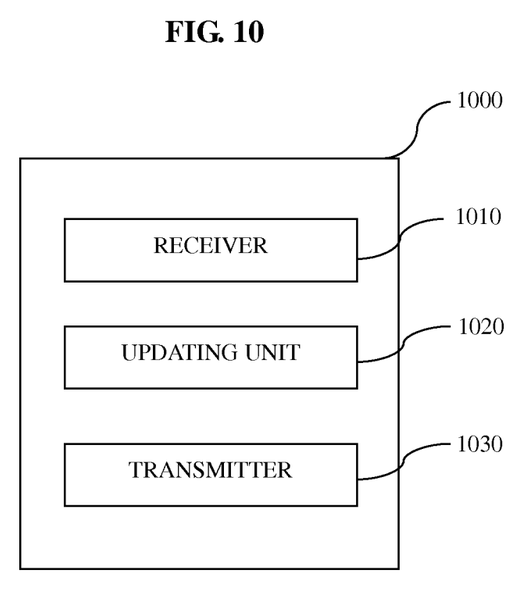
FIG. 10 is a diagram illustrating an example of a second content router in a CCN.

FIG. 10 illustrates an example of a second content router.

Referring to FIG. 10, second content router 1000 includes a receiver 1010, an updating unit 1020, and a transmitter 1030.

For example, a source node may move from a first domain including a first content router to the second domain including the second content router 1000. For example, the source node may determine that the source node has changed domains based on whether information about an underlying layer is changed. In this example, the source node may remotely transmit a prefix registration message to first content router via the second content router 1000. For example, the source node may transmit a prefix registration message to the receiver 1010 of the second content router 1000. The prefix registration message may correspond to an interest packet. The transmitter 1030 of the second content router 1000 may transmit the prefix registration message to the first content router.

The first content router receiving the prefix registration message may partially update routing information of the source node based on prefix information included in the prefix registration message. Thereafter, the first content router may transmit a response message reporting an update according to the prefix registration message is successful, to the source node via the second content router 1000. For example, the response message may be transmitted to the receiver 1010 of the second content router 1000.

In this example, the update unit 1020 of the second content router 1000 may partially update the routing information of the source node, in response to receiving the response message from the first content router. The routing information may be stored in a storage unit (not shown) in the second content router 1000. The transmitter 1030 of the second content router 1000 may transmit the response message to the source node.

According to various aspects, it is possible to resolve a poor aggregation issue of routing information, and it is possible to reduce updating of routing information due to a movement of a mobile source node and the corresponding overhead, thereby reducing a rate of use of an overall network resource by adding routing information. That is, instead of fully updating the routing information, the routing information of the corresponding mobile source node may be partially updated for content routers on a route through which the mobile source node moves.

According to various aspects, it is possible to prevent routing information in a network from increasing, thereby preventing an overall network performance from decreasing by revoking routing information of an extended route generated by a previous movement, in response to a mobile source node moving to another domain.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program to instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a mobile source node, the communication method comprising:
   determining whether the mobile source node moves from a first domain including a first content router to a second domain including a second content router, wherein the first and second domains are in a content centric network (CCN) that performs routing and/or delivery based on a content name; and
   transmitting a prefix registration message indicating that the mobile source node moves, to the first content router, via the second content router, based on whether the mobile source node moves, wherein
   a response message reporting that an update is successful is transmitted from the first content router to at least one intermediate router located on a route between the first domain and the second domain, based on whether a domain of the mobile source node matches a domain of the first content router.

2. The communication method of claim 1, wherein the determining comprises determining whether the mobile source node moves to the second domain based on whether information about an underlying layer of the mobile source node is changed.

3. The communication method of claim 1, wherein the prefix registration message comprises at least one of prefix information including a name of the mobile source node and signature information that identifies that the prefix registration message is transmitted by the mobile source node.

4. A communication method of a first content router, the communication method comprising:
   determining whether a prefix registration message is received, the prefix registration message indicating a mobile source node having content moves from a first domain including the first content router to a second domain including a second content router, wherein the first and second domains are in a content centric network (CCN) that performs routing and/or delivery based on a content name;
   partially updating routing information of the mobile source node based on whether the prefix registration message is received, wherein the prefix registration message comprises prefix information of the second domain; and
   transmitting a response message reporting that the update is successful to at least one intermediate router located on a route between the first domain and the second domain, based on whether a domain of the mobile source node matches a domain of the first content router.

5. The communication method of claim 4, wherein the routing information of the mobile source node is not updated in at least one intermediate router located at a position other than a route between the first domain and the second domain.

6. The communication method of claim 4, wherein the partially updating comprises determining whether a domain of the mobile source node matches a domain of the first content router based on the prefix registration message.

7. The communication method of claim 6, wherein the determining comprises determining whether a domain of the mobile source node matches a domain of the first content router based on prefix information included in the prefix registration message.

8. The communication method of claim 7, further comprising:
   determining whether the prefix registration message is received from the mobile source node based on signature information that is included in the prefix registration message.

9. The communication method of claim 1, wherein:
   the at least one intermediate router includes the second content router, and
   the at least one intermediate router partially updates routing information of the mobile source node, in response to receiving the response message.

10. The communication method of claim 9, wherein the at least one intermediate router partially updates routing information of the mobile source node by generating an individual forwarding information base (FIB) entry in relation to the mobile source node.

11. The communication method of claim 6, wherein:
the first content router includes an FIB used for forwarding a control packet in the CCN, and
the communication method further comprises forwarding the prefix registration message to another content router in another hop using the FIB, in response to a domain of the mobile source node failing to match a domain of the first content router.

12. The communication method of claim 4, further comprising:
receiving a new prefix registration message via a third content router, in response to the mobile source node moving from the second domain to a third domain including the third content router.

13. The communication method of claim 10, further comprising:
transmitting, to the at least one intermediate router, a revocation message for revoking the individual FIB entry generated by the at least one intermediate router in relation to the mobile source node, in response to the mobile source node moving from the second domain to a third domain including a third content router.

14. The communication method of claim 13, wherein the revocation message comprises at least one of prefix information of the mobile source node and signature information that identifies that the revocation message is transmitted from the first content router.

15. A non-transitory computer-readable storage medium having stored therein program instructions to cause a processor to execute a communication method of a mobile source node, the communication method comprising:
determining whether the mobile source node moves from a first domain including a first content router to a second domain including a second content router, wherein the first and second domains are in a content centric network (CCN) that performs routing and/or delivery based on a content name;
transmitting a prefix registration message indicating that the mobile source node moves, to the first content router, via the second content router, based on whether the mobile source node moves, the prefix registration message comprising prefix information of the second domain; wherein
a response message reporting that an update is successful is transmitted from the first content router to at least one intermediate router located on a route between the first domain and the second domain, based on whether a domain of the mobile source node matches a domain of the first content router.

16. A mobile source node, comprising:
a determining unit configured to determine whether the mobile source node moves from a first domain including a first content router to a second domain including a second content router, wherein the first and second domains are in a content centric network (CCN) that performs routing and/or delivery based on a content name; and
a transmitter configured to transmit a prefix registration message indicating the mobile source node moves, to the first content router, via the second content router, based on whether the mobile source node moves, the prefix registration message comprising prefix information of the second domain; wherein
a response message reporting that an update is successful is transmitted from the first content router to at least one intermediate router located on a route between the first domain and the second domain, based on whether a domain of the mobile source node matches a domain of the first content router.

17. The mobile source node of claim 16, wherein the prefix registration message comprises at least one of prefix information including a name of the mobile source node and signature information that identifies that the prefix registration message is transmitted by the mobile source node.

18. A content router, comprising:
a determining unit to determine whether a prefix registration message is received, the prefix registration message indicating a mobile source node moves from a first domain including the content router to a second domain including a second content router, wherein the first and second domains are in a content centric network (CCN) that performs routing and/or delivery based on a content name;
an updating unit configured to partially update routing information of the mobile source node based on whether the prefix registration message is received, wherein, the prefix registration message comprises prefix information of the second domain; wherein the updating unit transmitting a response message reporting that the update is successful to at least one intermediate router located on a route between the first domain and the second domain, based on whether a domain of the mobile source node matches a domain of the first content router.

19. The content router of claim 18, wherein the routing information of the mobile source node is not updated in at least one intermediate router located at a position other than a route between the first domain and the second domain.

20. A content router in a content centric network (CCN) including domains that perform routing and/or delivery based on content name, the content router comprising:
a receiver configured to receive a prefix registration message from a mobile source node indicating that the mobile source node has moved from a previous domain in the CCN including a previous content router to a current domain in the CCN including the content router; and
a transmitter configured to transmit the prefix registration message to the previous content router, the prefix registration message comprising prefix information of the current domain, wherein the content router is an intermediate router located on a route between the first domain and the second domain, and the receiver is further configured to receive a registration response message from the previous content router indicating a successful partial update of the source node's routing information, and the transmitter is further configured to transmit the registration response to the source node.

21. The content router of claim 20, further comprising an update unit configured to partially update routing information of the source node, in response to receiving the response message from the previous content router.

* * * * *